United States Patent [19]

Michihira et al.

[11] Patent Number: 5,274,638
[45] Date of Patent: Dec. 28, 1993

[54] MULTIPLEX TRANSMISSION SYSTEM FOR USE IN VEHICLES

[75] Inventors: Osamu Michihira; Masao Hideshima; Akira Sone, all of Hiroshima, Japan

[73] Assignee: Mazda Motor Corporation, Hiroshima, Japan

[21] Appl. No.: 675,816

[22] Filed: Mar. 27, 1991

[30] Foreign Application Priority Data

Mar. 30, 1990 [JP] Japan .................................. 2-81412

[51] Int. Cl.[5] ............................................. H04J 3/02
[52] U.S. Cl. .................................. 370/85.6; 370/13; 370/85.3
[58] Field of Search ............... 370/85.6, 85.3, 85.4, 370/95.2, 85.1, 85.2, 85.5, 9, 110.1, 13, 17; 340/825.50, 825.51

[56] References Cited

U.S. PATENT DOCUMENTS

| | | | |
|---|---|---|---|
| 4,584,487 | 4/1986 | Hesse et al. | 370/85.6 |
| 4,715,031 | 12/1987 | Crawford et al. | 370/94.1 |
| 4,841,520 | 6/1989 | Steely | 370/85.1 |
| 4,951,281 | 8/1990 | Muto et al. | 370/95.2 |
| 5,090,012 | 2/1992 | Kajiyama et al. | 370/85.3 |

FOREIGN PATENT DOCUMENTS

| | | |
|---|---|---|
| 0246666 | 11/1987 | European Pat. Off. . |
| 0319270 | 7/1989 | European Pat. Off. . |
| 0319271 | 7/1989 | European Pat. Off. . |
| 3248446 | 5/1984 | Fed. Rep. of Germany . |
| 2578070 | 8/1986 | France . |
| 64-36541 | 2/1964 | Japan . |
| 62-4658 | 1/1987 | Japan . |

OTHER PUBLICATIONS

K. Etschberger, et al., "Buscontrollerbaustein fur Echtzeitfahige Netze", Elektronik, vol. 38, No. 25, Dec. 8, 1989, Muchen, pp. 79-83.

Abul Masrur, "Digital Simulation of an Automotive Multiplexing Wiring System", IEEE Transactions on Vehicular Technology, vol. 28, No. 3, Aug. 1899, New York, pp. 140-147.

Ronald K. Jurgen, "Comming from Detroit Networks on Wheels", IEEE Spectrum, vol. 23, No. 6, Jun. 1986, New York, pp. 53-59.

Primary Examiner—Douglas W. Olms
Assistant Examiner—Shick Ham

[57] ABSTRACT

A system for reporting the occurrence of a failure in a multiplex communication network system in which a plurality of communication nodes are connected to one another and information is exchanged by transceiving frames. In the system, if a failure takes place in any of the communication nodes, the frame which reports the failure occurrence is transmitted to the network while being given the top priority.

11 Claims, 6 Drawing Sheets

MULTIPLEX TRANSMISSION SYSTEM FOR USE IN VEHICLES

BACKGROUND OF THE INVENTION

The present invention relates to a multiplex transmission system for a vehicle, wherein; a multiplex transmission method such as a CSMA/CD is employed to transmit signals in a vehicle. More particularly, the present invention relates to an improvement in how to quickly report a failure that has taken place in a communication node to other nodes.

A critical problem arises in that an enlargement of the wiring (wire harness) for connecting electronic parts to one another and complexity of the same become excessive in accordance with the recent advancement of electronic technology in vehicles. In order to particularly overcome a problem of the type described above in the field of the vehicles, a multiplex communication has been attracting attention. The multiplex communication is a system of transmitting a plurality of data items through one wire in a time division manner generally in accordance with a serial transmission method.

In the field of multiplex communication of vehicles, the types of network can be classified into a complete multiplex type and a partially multiplex type or classified into a centralized type and a decentralized type. The partially multiplex type has a structure formed by mixing non-multiplex communication portions and multiplex communication portions. The above-described multiplex communication portions are arranged in a manner that such switches and loads which are disposed away from one another are connected by multiplex communication units. Since the unit and the switches must be independently connected to one another by a wire and the unit and the loads must also be independently connected to one another by another wire, the overall length of wires can be shortened. However, the number of wires is undesirably increased. The centralized type network is arranged in such a manner that a plurality of slave transmission units are connected to one master transmission unit. Therefore, although an effect of reducing the bulk volume of the transmission lines can be obtained, the overall system will break down if the master transmission unit breaks down. Furthermore, another problem arises in that the design cannot easily be changed. On the other hand, the decentralized type network attracts attention (disclosed in, for example, Japanese Patent Laid-Open No. 62-4658) in spite of its high cost because the decentralized type network has a significant effect of reducing the bulk volume of the transmission lines, an excellent reliability against a breakdown and satisfactory flexibility in design change.

The decentralized multiplex communication system is arranged to employ the CSMA/CD method according to a SAE (Society of Automotive Engineers) standard design. In Japanese Patent Publication No. 62-302421 (which corresponds to U.S. Pat. No. 4,951,281 commonly assigned to the assignee of the present invention, there is disclosed a PALMNET (Protocol for Automobile Local Area Network), which is an improvement of the above-described CSMA/CD method. Furthermore, according to a disclosure made by the assignee of the present invention in Japanese Patent Laid-Open No. 64-36541, a master node is provided to transmit reference pulses for time-dividing bus access rights so as to provide channels on a transmission passage.

In the conventional decentralized multiplex communication system for use in a vehicle, a critical problem does not rise in the data communicating speed since simply structured switches or solenoids are adopted to this system. However, if an engine controller, an active suspension controller, a traction controller and the like are intended to be adopted to the multiplex communication, a problem of communicating speed a rises since the above-described controllers respectively need a large quantity of information items to be processed. It is an essential factor for the decentralized multiplex communication system for use in a vehicle and consisting of nodes which have the controllers needing the high speed data process to quickly detect the state of a failure taken place in a node. If the failure is detected after a time delay, the control of the overall system is undesirably performed in accordance with incorrect or old data.

Hitherto, the node which has detected its failure transmits a frame indicating the occurrence of the failure to the network so as to report it to the overall system. An example of a structure in which the frame showing the occurrence of a failure is transmitted has been disclosed in U.S. Pat. No. 5,090,012 by the assignee of the present invention. However, the decentralized multiplex transmission system for use in a vehicle creates a problem in that a failure report cannot sometimes be performed quickly because an access right for the transmission passage is necessary to report the failure state to the system.

SUMMARY OF THE INVENTION

Accordingly, an object of the present invention is to provide a multiplex transmission system for use in a vehicle capable of recognizing the occurrence of a failure.

In order to achieve the above-described object, according to one aspect of the present invention, there is provided a multiplex communication system for use in a vehicle and having a plurality of communication nodes connected to a common multiplex transmission passage and arranged in such a manner that a frame is transceived between the communication nodes so as to exchange information for the purpose of controlling the operation of the vehicle, the system comprising:

arbitrating means for arbitrating the transmission of said frame in a normal operation in accordance with information about the priority given to said frame;

detection means for detecting the occurrence of a failure in a certain communication node or the common multiple transmission passage;

transmitting means for transmitting a frame showing the detected occurrence of the failure to said transmission passage while giving a higher priority to said frame than in the normal operation; and execution means provided for each of said communication nodes, said execution means performing a control to correspond to the failure after it has received said frame transmitted by said transmitting means.

Another object of the present invention is to provide a system arranged in such a manner that each of the communication nodes has a function of reporting a failure generated in any of the communication nodes with the top priority.

A further object of the present invention is to provide a system having an exclusive frame for reporting the occurrence of a failure.

Another object of the present invention is to provide a system arranged in such a manner that a control to correspond to a failure is performed at all of the communication nodes which have received an exclusive frame for reporting the occurrence of a failure in a case where the exclusive frame for reporting the occurrence of the failure is provided.

Another object of the present invention is to provide a system capable of detecting a collision of a transmitted failure occurrence report frame with another frame.

Another object of the present invention is to provide a system capable of quickly reporting the failure occurrence report frame to the other communication node by setting a waiting time period until the frame is transmitted again to be the shortest time if the collision of the frames is detected.

According to another aspect of the present invention, the failure occurrence report frame has an information field for specifying any one of said communication nodes connected to said system and another information field showing whether or not a failure has been generated in said communication node.

According to another aspect of the present invention, when the failure occurrence report frame is received, the communication node is specified and this communication node is marked as being inoperative.

According to another aspect of the present invention, when information about the communication node which has been marked as inoperative is necessary for the other communication node, the other communication node uses nominal data of the information.

Additional objects and advantages above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

PREFERRED EMBODIMENT OF THE INVENTION

A preferred embodiment of the present invention will now be described with reference to the drawings, where the present invention is employed in a multiplex communication system for a vehicle which employs the above-described PALMNET system. That is, a plurality of communication nodes are contained in the system so that, when a failure takes place in any one of the communication nodes, the communication node, in which the failure has taken place, transmits a "failure report frame" to the overall system. This embodiment is characterized in that the passage through which the "failure report frame" is transmitted is given the highest priority of an access right.

Figure 1:
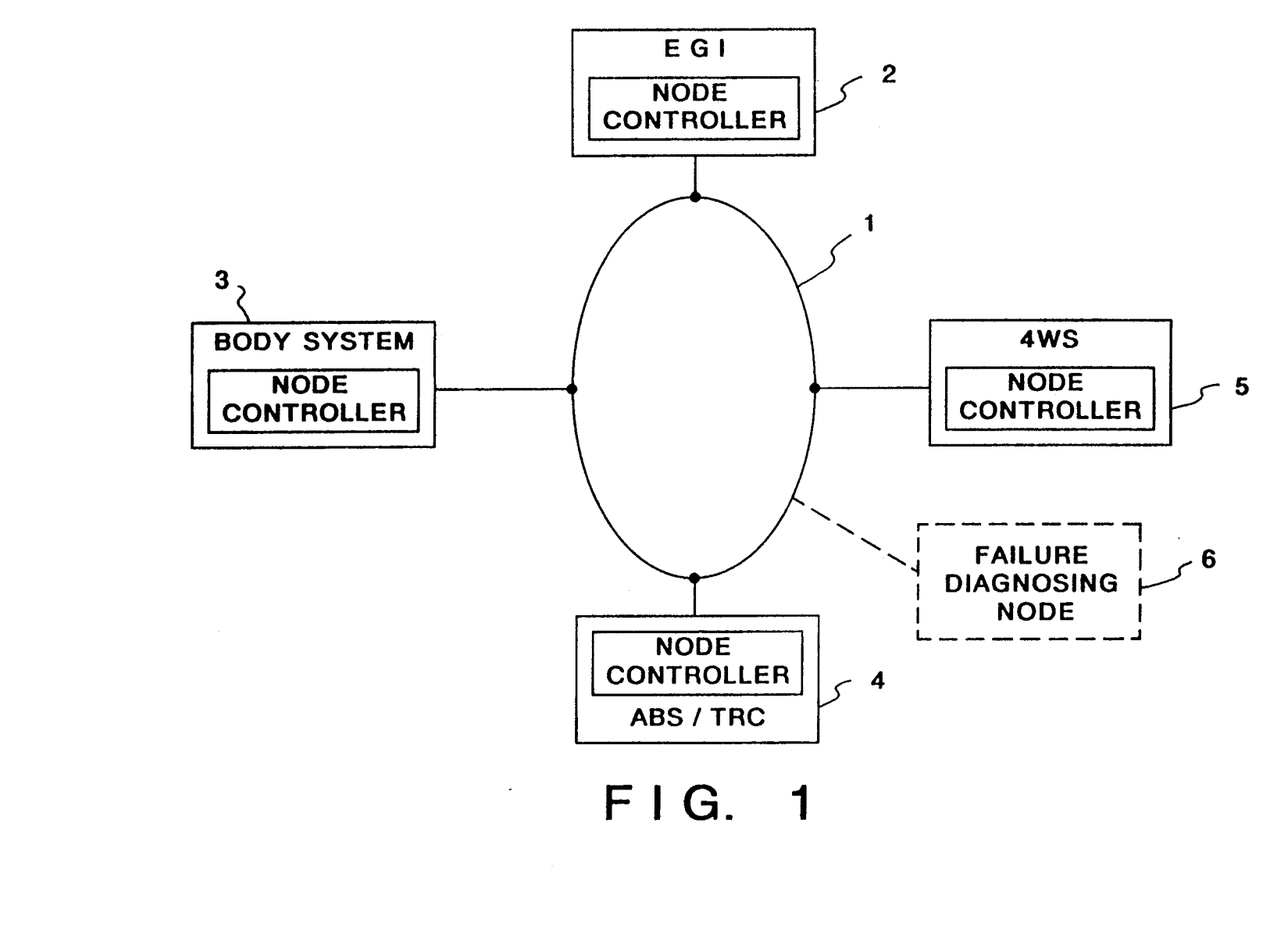
FIG. 1 is a diagram which illustrates a network of an embodiment of a multiplex transmission system according to the present invention.

FIG. 1 illustrates the structure of a network system according to this embodiment. In order to simplify the description, the network system according to this embodiment has four communication nodes. Referring to FIG. 1, reference numeral 1 represents a transmission line made of a twisted wire pair. Furthermore, the communication speed is arranged to be a relatively low speed of 20 kbps. However, the four communication nodes do not have to wait for the access and thereby their communications can be established. The four communication nodes comprise three high communications nodes, that is, an ABS/TRC communication node 4 having a slip controller (anti-lock brake/traction controller) for preventing locking of the brake, an EGI communication node 2 having an EGI controller for controlling the engine and a 4WS communication node 5 having a 4WS controller (that is a, rear wheel steering controller). Furthermore, the network system according to this embodiment has a low speed communication node 3 having a controller for controlling switches relating to the vehicle body. The network system according to this embodiment is capable of including other communication nodes in addition to the above-described communication nodes.

Referring to FIG. 1, reference numeral 6 represents a communication node for diagnosing failures and is connected to the system if necessary, the communication node 6 having a failure diagnosis device.

Figure 2:
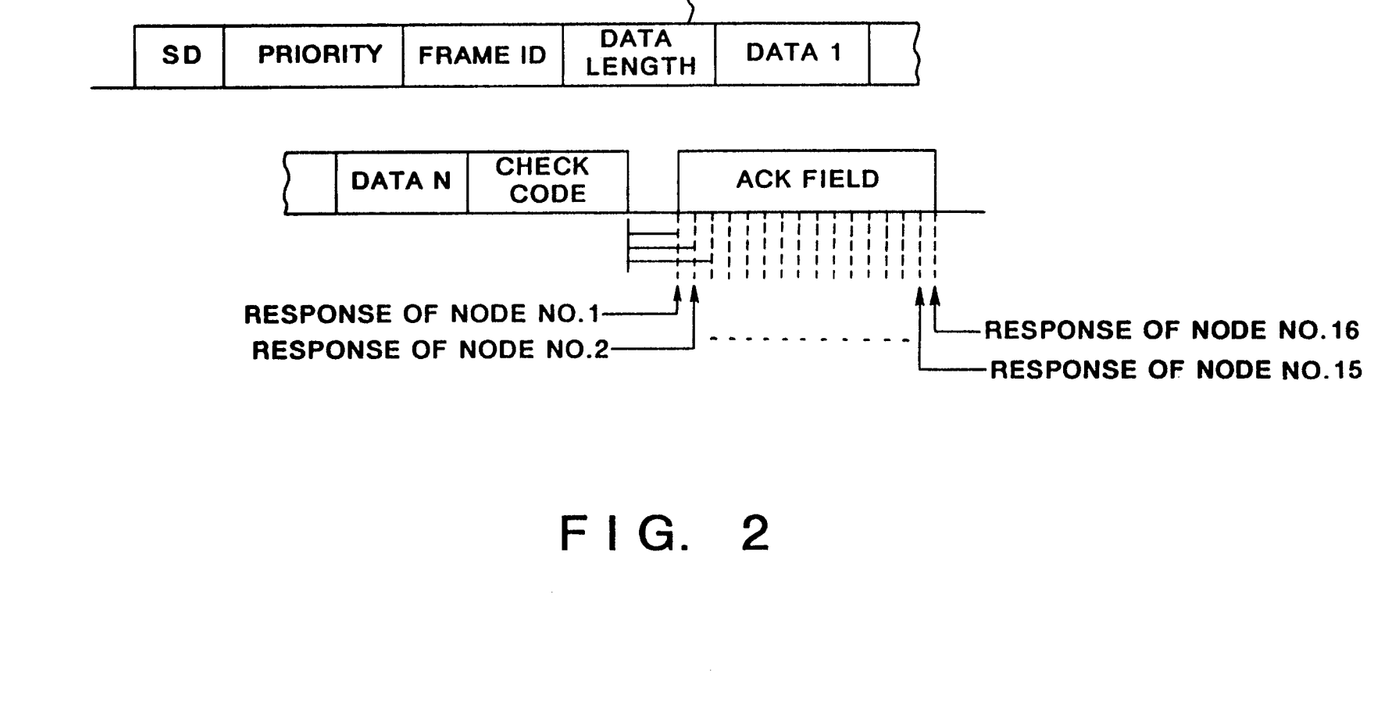
FIG. 2 is a diagram which illustrates the format of a frame for use in the embodiment of the present invention.
Figure 4:
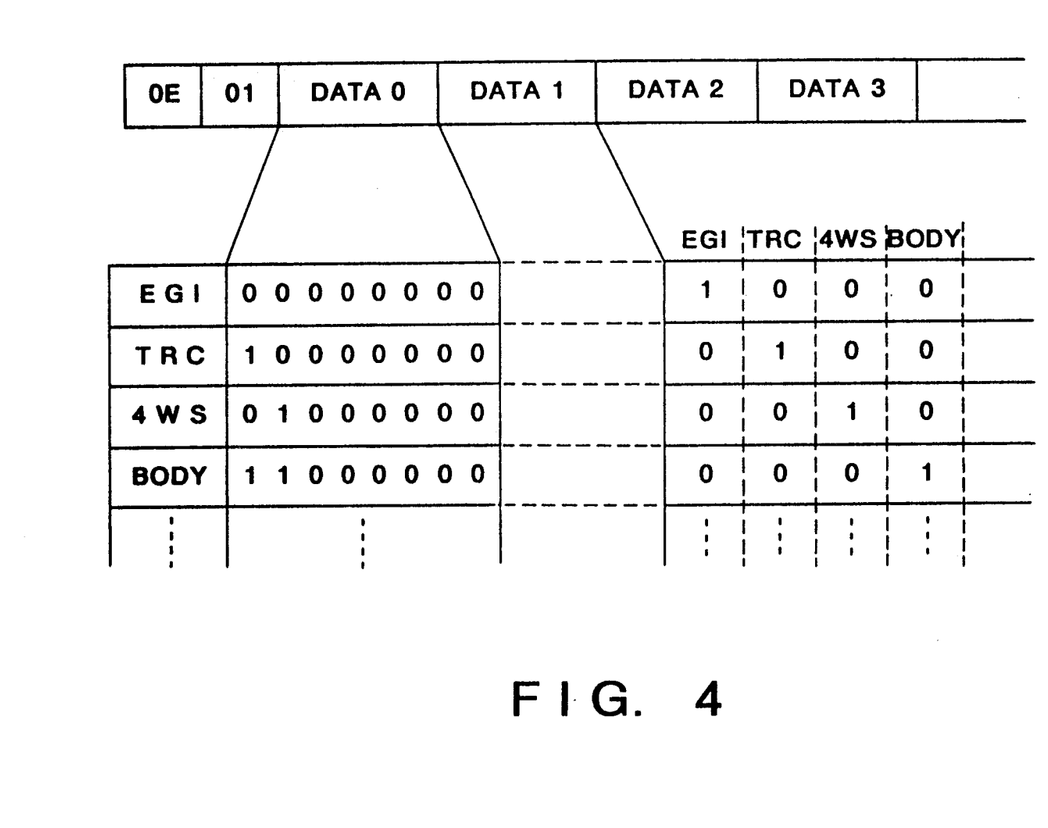
FIG. 4 is a diagram illustrating an example of the format of a failure report frame.

In the multiplex transmission system according to this embodiment, information about the operation of the vehicle is transmitted within a frame F constituted as shown in FIG. 2. Also the "failure report frame" according to this embodiment is transmitted in the form as shown in FIG. 4.

A frame F is constituted by a SD (Start Delimiter) code, a priority code, a frame ID code, a data length, data 1 to data N and a check code.

The "SD code" is a special code denoting the start of the frame F so that a reception-side multiplex communication node recognizes the start of the frame F when it receives the SD code. The "priority code" is a code which instructs the priority of a signal to be processed if a plurality of multiplex communication nodes simultaneously transmit data and thereby their signals collide with each other. According to this embodiment, higher priority is given to lower bit signals since the low level is arranged to be WIRED-OR in bus 1. If a plurality of communication nodes simultaneously transmit signals, the "priority code" for a communication node to which high priority is given is left on the bus 1. Therefore, the communication node to which a lower priority is given is able to detect a collision from the fact that the "priority code" transmitted therefrom is converted into the other code. Furthermore, the communication node to which a lower priority is given delays the re-transmission of its failed frame. In consequently, the communication node having higher priority is given a priority to be re-transmitted. The failure report frame is, as described later (see FIG. 4), assigned with "OE" to which the top priority is given in the multiplex system according to this embodiment.

The "frame ID code" is a code for identifying the subject frame. Any of the failure report frames according to this embodiment has a common ID "01" regardless of the originator node which has issued that failure report frame. Information about a fact that which node is failed is stored in an ensuing data bit (DATA). The above-described ID code has a so-called "Functional Addressing" function the concept of which has been disclosed in U.S. Pat. No. 5,090,012 by the assignee of the present invention. Therefore, the disclosure of U.S. Pat. No.5,090,012 is incorporated herein by reference.

The number of ensuing data items is written to the "Data Length" and is used in such a manner that a data length of N is transmitted if there is N data items. The multiplex communication node which has received that frame reads the data by the quantity corresponding to the data length. The field disposed next to that data is a CRC check code (error detection code). When the CRC check code is confirmed, the end of the frame can be detected. The format shown in FIG. 2 is in a general form and the data length of the frame according to this embodiment has a common length of 4 bytes. The controllers of the nodes shown in FIG. 1 need various information to operate properly. However, all the information is not concerned with all the controllers of the nodes. According to this embodiment, the above-described ID code is used to specify the communication node which needs the information stored in the 4 bytes in the DATA portion. That is, the information to be stored in the 4 bytes in the data portion has been predetermined in accordance with the value of the ID code. Therefore, the data transmitting side communication node determines the necessary ID code depending upon the information to be transmitted in the form of the frame. The other nodes respectively determine whether or not the frame includes the information necessary for the other nodes when they receive that frame. According to this embodiment, the ID code for the failure report frame is "01" as described above. The communication nodes which have received the frame having the ID "01" process this frame as a failure report frame which has been transmitted thereto since all the nodes recognize that a frame having the ID "01" means a failure report.

Figure 3:
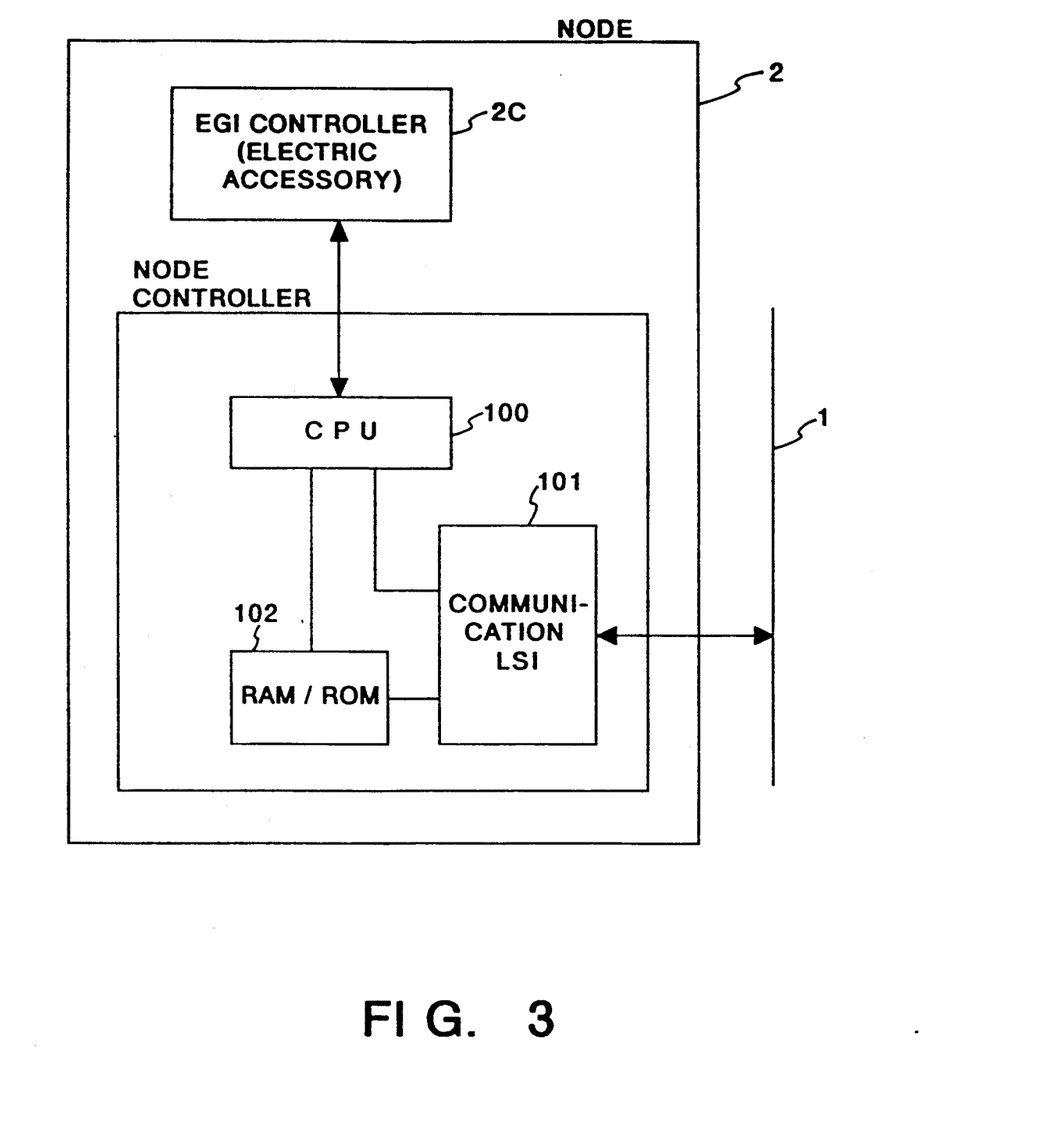
FIG. 3 is a block diagram which illustrates the structure of a an EGI node, as an example of multiplex transmission device.

FIG. 3 illustrates the structure of a typical communication node having an EGI controller 2c for controlling the engine. As provided by example in FIG. 3, each of the communication nodes of FIG. 1 comprises electric equipment or an accessory such as the EGI controller 2c, and a communication node controller. Each of the communication nodes is connected to a transmission passage 1 via a communication LSI 101. Reference numeral 100 represents a CPU for controlling LSI 101, the CPU 100 being operated in accordance with a program stored in a RAM/ROM 102. A protocol control of the physical layer level in accordance with the CSMA/CD system is performed by the LSI 101. CPU 100 controls LSI 101, processes data transmitted from the LSI 101 so as to send it to EGI controller 2c and controls transmitting the data transmitted from EGI controller 2c to LSI 101. That is, CPU 100 converts frame data on the bus into a format which can be used by EGI controller 2c for the controller which exclusively controls the engine. Furthermore, CPU 100 converts data transmitted from EGI controller 2c into a frame format.

FIG. 4 illustrates the format of the failure report frame. As described above, the above-described frame is assigned with a priority of "OE", that is, it is set to the highest priority. As a result, the supply of the failure report frame to the overall system is performed with the highest priority. In this case, the ID is arranged to be "01". DATA #0 field specifies an originator communication node that has sent the failure report frame. According to this embodiment, "00000000" denotes the EGI communication node as originator, "10000000" denotes the ABS/TRC communication node, "01000000" denotes the 4WS communication node and "11000000" denotes the body system communication node. DATA #2 field specifies a communication node which is failing. The first bit of the DATA #2 field shows a failure state of the EGI communication node, the second bit of the same shows a failure state of the ABS/TRC communication node, the third bit of the same shows a failure state of the 4WS communication node and the fourth bit of the same shows the state of the failure that has taken place in the body system communication node. That is, if the subject bit is "1", the fact that a failure has occurred is shown. If the same is "0", the fact that no failure takes place is shown.

Figure 5A:
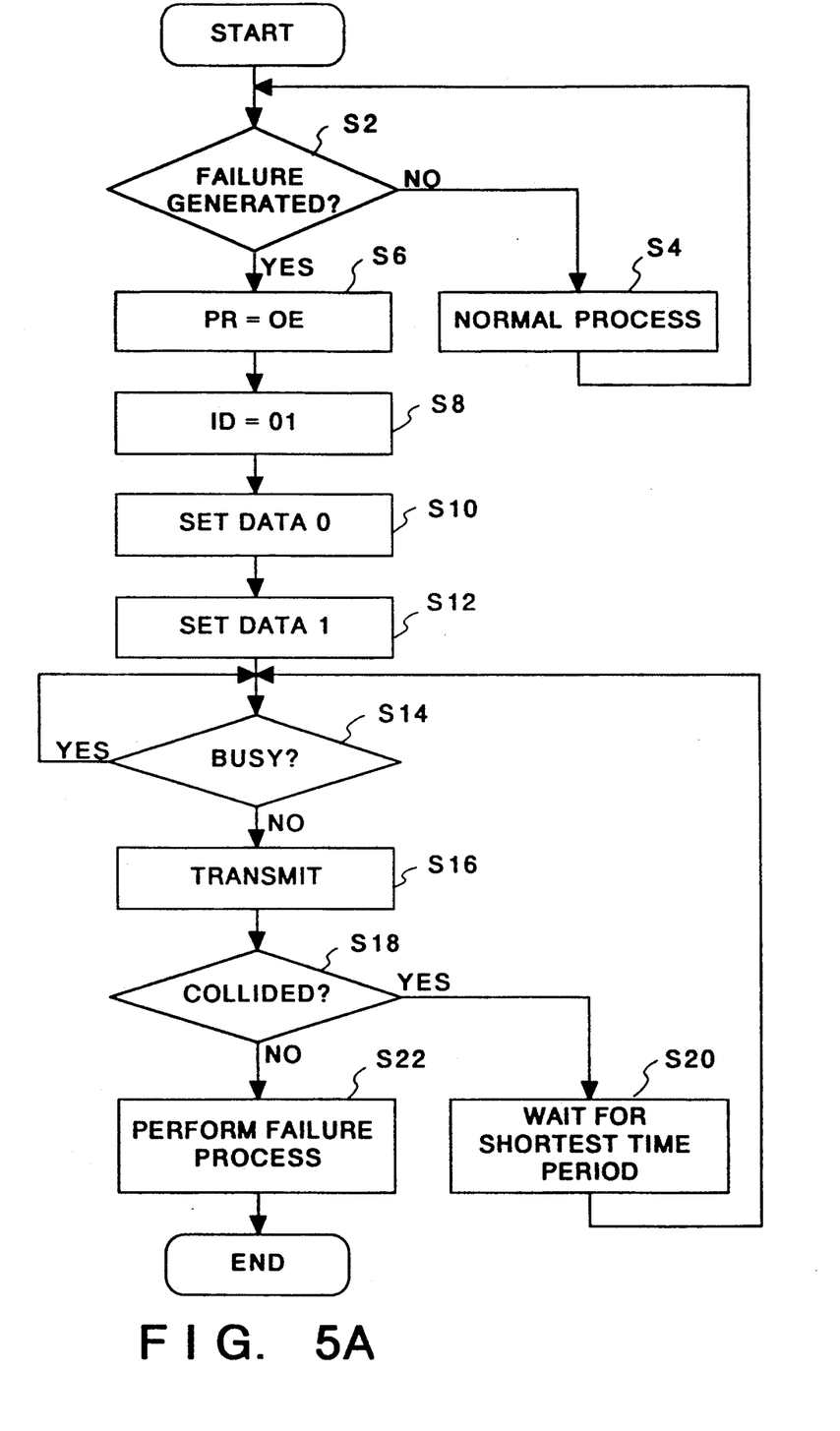
FIGS. 5A and 5B are flow charts for a control procedure of transmitting/receiving the failure report frame in the node according to the embodiment of the present invention.
Figure 5B:
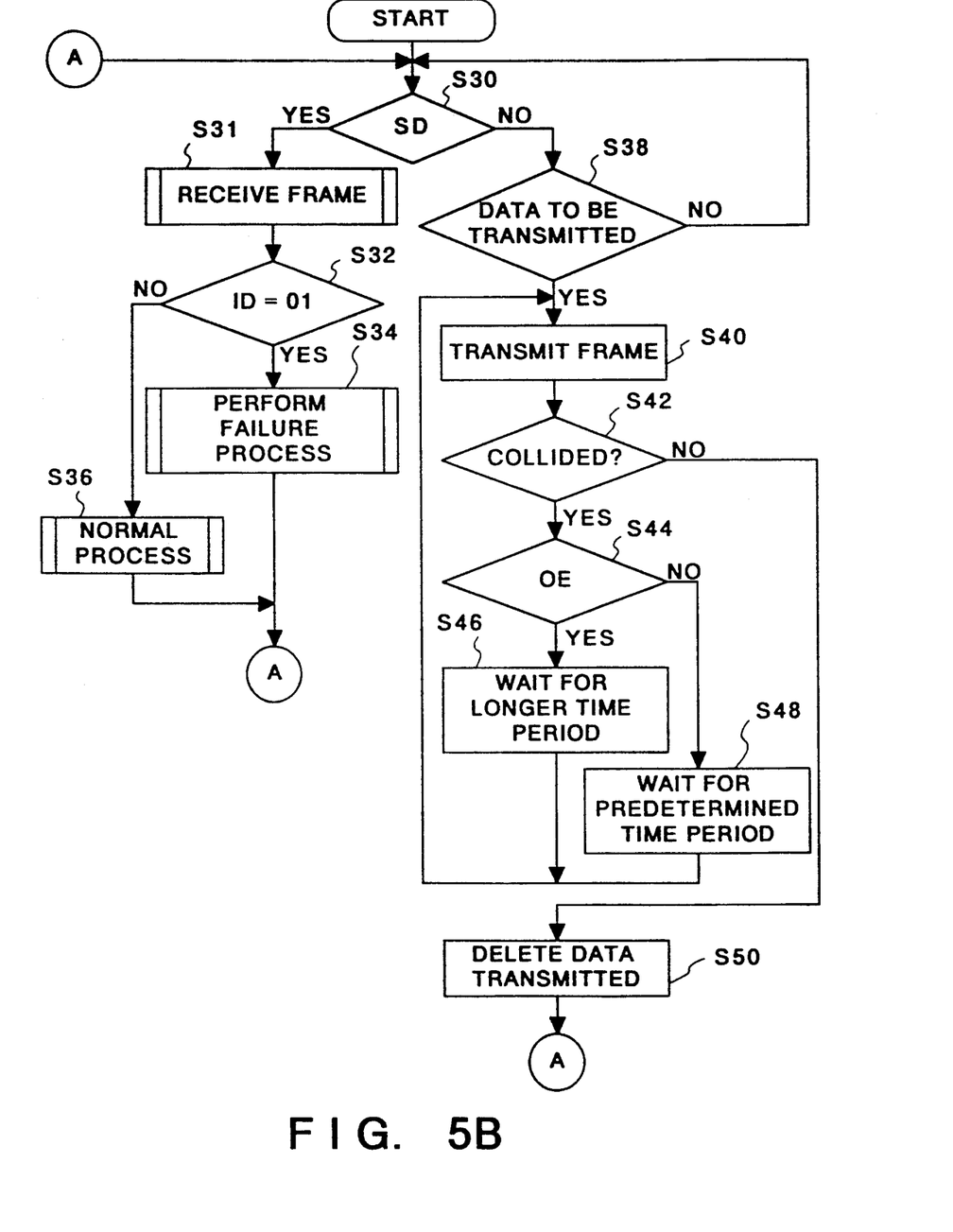

Referring to FIGS. 5A and 5B, a control procedure at one of the communication nodes of the system according to this embodiment will be described. FIG. 5A illustrates a sequence of transmitting the failure report frame in a certain communication node in which a failure has taken place. FIG. 5B illustrates a sequence of transmitting the failure report frame in the other communication node. Each of the communication nodes connected to the network shown in FIG. 1 is arranged to act in accordance with sequences shown in FIGS. 5A and 5B.

Referring to FIG. 5A, the communication node determines, in step S2, whether or not the failure state has been detected. If it is determined that no failure has been detected, the flow advances to step S4 in which a general or normal process is performed. The general process is one which should be performed by the subject communication node in such a manner that, in a case where the subject node is the EGI communication node, for example, data about the engine speed and data about the throttle opening are transmitted.

In step S2, if it is has been determined that a failure state has been detected, the flow advances to step S6 and ensuing steps. The "failure state" is exemplified by the occurrence of a parity error in a memory of the controller of the subject communication node and a failure of the EGI controller, the TRC controller or the like which is subjected to the communication process by the subject communication node.

In steps S6 through S12, preparation for the failure report frame is made. That is, in step S6, priority PR is set to priority "OE". In step S8, the ID is set to "01" which shows that the subject frame is the failure report frame. In steps S10 and S12, a bit (DATA #0) denoting the communication node which will transmit the subject frame and a bit (DATA #2) denoting the communication node which has failed are set in the two bytes of the DATA field.

In step S14, it is confirmed that the transmission passage 1 is not busy before the failure report frame prepared in steps S6 through S12 is transmitted in step S16. In step S18, it is determined whether of not the failure report frame transmitted at this time has collided with another frame simultaneously transmitted from one of the other communication nodes. It can be detected depending upon whether or not data of the data bit in the failure report frame except for the priority field has been changed by the other frame.

If it is determined that no collision has taken place, the flow advances to step S22 in which that communication node performs a process corresponding to the generated failure. If it is determined in step S18 that a collision has taken place, the flow advances to step S20 in which waiting for a predetermined time is performed. Subsequently, the flow returns to step S14 in which that failure report frame will be transmitted again. The waiting time period to be taken in step S20 is set to be the shortest time of ordinary periods which are taken when the communication node of the network system according to this embodiment detects the collision. That is, the decentralized multiplex communication system usually employs, as the above-described waiting time period, a time period set in a random number manner or a fixed time period predetermines for each of the communication nodes. However, according to this embodiment, the above-described waiting time period is set to the shortest time if any one of the communication nodes transmits the failure report frame. As a result, the failure report frame can be quickly transmitted to the overall system.

FIG. 5B shows the procedure for receiving the failure report frame. In step S30, it is determined whether or not the SD code is present on the transmission passage 1. If it is determined that the SD code is present, the flow advances to step S31 in which the frame to which that code is attached is received. In step S32, it is determined whether or not the ID in the received frame is "01". If the ID in that frame is "01" which shows an occurrence of the failure, the flow advances to step S34 in which a failure process is carried out by the node. The failure process is an operation for checking the above-described two DATA fields (DATA 0 and DATA 1 shown in FIG. 4) so as to specify the failure communication node, and this communication node is then separated from the system. More specifically, this communication node is marked as "dead" as inoperative. If the present node needs information of the failed communication node, a nominal value, which has been previously set as the information, is used so that the control may continue an urgent operation.

In step S32, if it has been determined that the ID is not "01", the flow advances to step S36 in which the frame is treated in the normal process.

If no SD code is detected on the transmission passage in step S30, the flow advances to step S38 in which it is determined whether or not the subject communication node has data to be transmitted to other communication nodes. If it has the data to be transmitted to the other communication nodes, the flow advances to step S40 in which the data is arranged in the form of a frame so as to be transmitted to the other communication nodes. In step S40, a busy determination operation which is also performed in step S14 shown in FIG. 5A is performed although it is not shown in FIG. 5A. In step S42, it is determined whether or not the frame transmitted from the subject communication node has collided with the data from the other communication nodes. If it is determined that there has not been such a collision, the flow advances to step S50 in which the subject frame is deleted from the cue of the transmission data.

Then, a control to be performed in a case where it has been determined in step S42 that the collision has taken place will now be described. The above-described collision can include a collision with an ordinary frame transmitted from the other communication nodes and/or a collision with the failure report frame. In step S44, it is determined whether or not the collision was with a failure report frame. If the collision was with the failure report frame, the flow advances to step S46 in which the re-transmission will wait for the predetermined longest time period. This assures that the other communication node which has intended to report the failure occurrence can easily obtain an access right when it re-transmits the failure report frame.

If it is determined in step S44 that the collision is not with the failure report frame, the flow advances to step S48 in which re-transmission will wait for a predetermined waiting time period which has been previously assigned to that communication node. In this connection, a waiting time period which is assigned to a higher priority node is shorter.

EFFECTS OF THE INVENTION

As described above, according to the present invention, the following effects can be obtained:

(1) If any one of the communication nodes in it, the node generates the failure report frame so as to transmit it while giving the top priority to it. Therefore, the occurrence of the failure state can quickly be reported to the overall system.

(2) The structure according to the above-described embodiment has a frame dedicated for reporting the failure. In other words, the embodiment does not adopt a method of inserting a bit denoting the occurrence of a failure into a general frame. Adoption of the dedicated failure report frame makes failure administration easier.

(3) Since the failure report frame is arranged to individually have a bit denoting the originator node which generates the failure report frame and a bit for identifying whether or not the failure state is present in the originator node, the failure can be assuredly reported.

MODIFICATION

It is understood that the present preferred embodiment can be changed in the details of construction and the combination and arrangement of parts may be resorted to without departing from the spirit and the scope of the invention.

For example, the number of the communication nodes is not limited to four.

Although the structure according to the above-described embodiment has the dedicated frame for reporting a failure arranged in such a manner that ID=01, the following modification can be made. More specifically, a bit for identifying the failure state is disposed in an ordinary format frame which is not the dedicated frame. Furthermore, when the failure state is to be reported, the top priority is given to that ordinary frame. In this case, since a bit field denoting the occurrence of a failure must be provided in the frame, the overall length of the frame becomes longer than that of the frame shown in FIG. 4.

Furthermore, according to the above-described embodiment, the failure report frame, as shown in FIG. 4, individually has a bit specifying the originator node which generates the failure report frame and a bit for identifying whether or not the failure state is present in the originator node which transmits that failure report frame. The reason for this lies in that the bit for the originator node is necessary because the ID code of the failure report frame for all of the communication nodes is arranged to be a common code "01". Therefore, it is suggested that this kind of report frame be utilized as a failure diagnoses frame at a service factory or the like. More specifically, a failure diagnosis is performed at the service factory by connecting the failure diagnosis communication node 6 shown in FIG. 2 to the network. The failure diagnosis device 6 has a diagnosis node for instructing all of the communication nodes to report whether or not the failure state is present to that failure diagnosis communication node 6. As a result, the diagnosis device 6 is capable of identifying the failing node in accordance with the returned failure report frames. Consequently, if the above-described special failure diagnosis is not necessary, the bit showing the originator node can be omitted from the structure.

Furthermore, the occurrence of a failure can quickly be reported to the overall system by transmitting the frame showing the failure state to the transmission passage while giving top priority to that frame. As a result, the system is able to quickly perform a process to correspond to the failure.

According to the above-described embodiment, all of the communication nodes equally have a function or capability for transmitting the failure report frame. Accordingly, a modification to the embodiment is suggested wherein a master communication node for exclusively reporting a failure is included in the network. When the master node thus constituted detects a failure that has taken place in any of the communication nodes, it transmits the above-described report frame to the transmission passage. In this case, it is an essential factor for the master node of the type described above to detect how the failure occurs in the other communication node. A failure taken place in the transmission operation on the network can be detected by the master node connected to the network by always monitoring the re-transmission due to the communication failure. The master node is able to detect the failure of a controller of the other communication nodes via another transmission passage which is exclusively used for reporting the failure.

The present invention is not limited to the above embodiments and various changes and modifications can be made within the spirit and scope of the present invention. Therefore, to apprise the public of the scope of the present invention the following claims are made.

What is claimed is:

1. A multiplex communication system for use in a vehicle and having a plurality of communication nodes which are connected to a common multiplex transmission passage and arranged in such a manner that a frame is transceived between said communication nodes so as to exchange information for the purpose of controlling the operation of the vehicle, the system comprising:
arbitrating means for arbitrating the transmissions of said frames of the nodes in accordance with information about priority given to said frame in a normal operation;
detection means for detecting the occurrence of a failure in a certain communication node or the common multiplex transmission passage;
preparation means for preparing a failure report frame showing the detected failure occurrence while giving a higher priority to said frame than in the normal operation;
transmitting means for transmitting said failure report frame to said transmission passage; and
execution means provided for each of said communication nodes, said execution means performing a control corresponding to the failure after it has received said failure report frame transmitted by said transmitting means.

2. A system according to claim 1, wherein said arbitrating means, said detection means and said transmitting means are provided for each of said communication nodes, and said execution means for each of said communication nodes further comprises:
reception means for receiving a frame on the passage sent from the transmitting means of the other communication node; and
means for performing the control corresponding to the failure at the other node.

3. A system according to claim 1, wherein said failure report frame contains identification information denoting that said failure report frame is for reporting the failure occurrence.

4. A system according to claim 2, wherein said failure report frame contains identification information denoting that said failure report frame is a frame for reporting the failure occurrence.

5. A system according to claim 4, wherein said execution means of all of said communication nodes which have received said failure report frame containing said identification information perform the control corresponding to the failure.

6. A system according to claim 1, wherein said arbitrating means includes means for detecting a collision of said frames.

7. A system according to claim 6, wherein said arbitrating means acts in accordance with a CSMA/CD type arbitrating method.

8. A system according to claim 6, wherein said arbitrating means further includes means for setting a waiting time period to be the shortest time, said waiting time period being taken until said frame is re-transmitted if said detection means detects the collision of said frames.

9. A system according to claim 4, wherein said failure report frame has an information field for specifying any one of said communication nodes connected to said system as well as an information field showing whether or not a failure has occurred in any one of said communication nodes.

10. A system according to claim 1, wherein said execution means includes:
means for specifying said communication node, in which the failure has occurred, in accordance with said received frame; and
means for marking said specified communication node as being inoperative.

11. A system according to claim 10, wherein said execution means of each of said communication nodes has nominal value data prestored therein about information to be transmitted by the other communication node in a normal state whereby, when a certain communication node has been marked as being inoperative, said nominal value data is used if said information from said communication node which has been marked inoperative is necessary.

* * * * *